United States Patent [19]

Bouchard et al.

[11] Patent Number: 4,698,040

[45] Date of Patent: Oct. 6, 1987

[54] METHOD OF MAKING ARC DISCHARGE LAMPS

[75] Inventors: Andre C. Bouchard, Peabody; Paul A. Thibault, Danvers, both of Mass.

[73] Assignee: GTE Products Corporation, Danvers, Mass.

[21] Appl. No.: 921,308

[22] Filed: Oct. 22, 1986

[51] Int. Cl.⁴ .................................................. H01J 9/24
[52] U.S. Cl. .......................................... 445/26; 445/43
[58] Field of Search ........................ 445/23, 26, 27, 38, 445/43; 65/34

[56] References Cited

U.S. PATENT DOCUMENTS

| | | | |
|---|---|---|---|
| 4,508,514 | 4/1985 | English | 445/26 |
| 4,539,510 | 9/1985 | Bouchard | 445/26 |
| 4,560,357 | 12/1985 | Bouchard | 445/26 |
| 4,575,344 | 3/1986 | Bouchard | 445/26 |

Primary Examiner—K. Rowan
Attorney, Agent, or Firm—Carlo S. Bessone

[57] ABSTRACT

A method of making a compact fluorescent lamp by providing a sealed, exhausted and prefilled light emitting capsule which is mounted within a jacket formed from a glass transparent to a given range of radiation. The jacket is then exhausted, filled and sealed with the same pressure and type buffer gas as is contained in the light emitting capsule. A laser then pierces the capsule allowing communication of gases in the outer jacket with those in the light emitting capsule. This permits a much faster exhaust sequence for the light emitting portion of the lamp and outer jacket.

10 Claims, 4 Drawing Figures

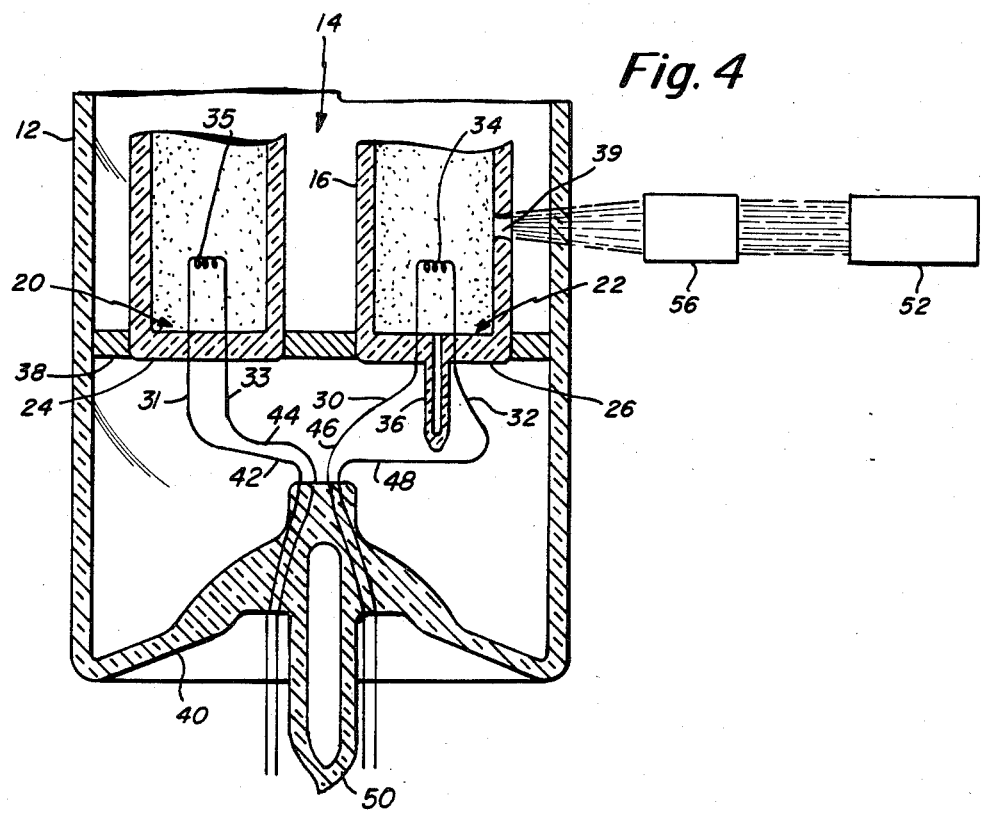

METHOD OF MAKING ARC DISCHARGE LAMPS

TECHNICAL FIELD

The present invention relates in general to arc discharge lamps and pertains, more particularly, to fluorescent lamps. Even more particularly, the invention relates to an improved method of making a jacketed fluorescent lamp without compromising, and with in fact enhancing, light output.

BACKGROUND OF THE INVENTION

The fluorescent lamp is a widely utilized light source for general illumination applications, primarily because of its relatively low initial cost and its efficacy; i.e., its light output relative to its power input, usually expressed as lumens per watt (LPW). These fluorescent lamps are constructed in the wide variety of configurations and sizes. However, specific reference herein is made to compact fluorescent lamps. In this regard, refer to U.S. Pat. No. 4,560,357 assigned to the assignee of the present invention. Further reference will be made hereinafter to this U.S. patent.

There presently exists a number of different methods of jacketing a fluorescent lamp. One of the most rudimentary techniques is to simply envelope the light emitting tube or tubes in a transparent plastic or glass jacket. However, it has been found that this jacketing technique substantially reduces the light output of the lamp because the insulating properties of the jacket render the mercury vapor pressure inside the light emitting tubes too high. The high mercury vapor pressure substantially degrades the lamp efficiency.

Another method of jacketing a fluorescent lamp also envelops the light emitting tubes in a jacket. However, this method incorporates a mercury amalgam inside the light emitting tubes to lower the vapor pressure of the mercury during operation. A disadvantage of this method is that the amalgam is costly and difficult to incorporate in lamps. Additionally, the lamps require a longer warm-up time to full intensity than do standard lamps employing only mercury.

Another form of jacketed lamp is of the type disclosed in the aforementioned U.S. Pat. No. 4,560,357. In this method of making a fluorescent lamp, the inner lamp assembly, unfilled, and with its exhaust tubulation open, is mounted within the jacket or envelope. The envelope is then exhausted and filled with an arc generating and sustaining medium, and the envelope exhaust tubulation is sealed. The lamp is in operable condition because the arc generating and sustaining medium contained within the envelope penetrates the open inner lamp assembly tubing; which tubing is not hermetically sealed. One of the major disadvantages with this particular method of jacketing is that the exhaust step is too time consuming and/or alternatively requires some special techniques to rapidly heat the interior lamp components which, by virtue of the jacketing, are insulating from the outer environment.

In order to exhaust and fill a lamp of the type described in U.S. Pat. No. 4,560,357, the lamp is attached to an exhaust machine and the whole assembly is heated to speed-up the exhausting. However, because the inner lamp assembly has to be exhausted via the envelope, there is essentially a heat insulating environment therebetween that makes it quite difficult to conduct the heat properly to the inside lamp components and thus the step of exhausting is relatively slow. This requires that the lamp be left on the exhaust machine for too long a period of time.

Also, with the method described in U.S. Pat. No. 4,560,357, it is furthermore noted that there are additional tube constrictions, primarily in the form of the inner lamp assembly exhaust tubulation. These constrictions further slow the exhaust procedures.

BRIEF SUMMARY OF THE INVENTION

It is, therefore, an object of this invention to obviate the disadvantages of the prior art outlined hereinbefore.

It is another object of the invention to enhance the operation of arc discharge lamps, and in particular compact fluorescent lamps.

It is a further object of the invention to provide an improved method of jacketing fluorescent lamps, and in particular a method that can be carried out quickly, efficiently and without degrading the stabilized lamp output.

It is still another object of the invention to provide an improved method of jacketing a fluorescent lamp, preferably a compact tubular fluorescent lamp and which has a stabilized light output in excess of a non-jacketed lamp.

These objects are accomplished, in one aspect of the invention, by the provision of a novel method of jacketing fluorescent lamps. The method comprises forming an inner lamp assembly including at least one section of phospher coated tubing having end closing means mounting electrodes within the tubing. The inner lamp assembly has an exhaust tubulation projecting therefrom. The inner lamp assembly tubing is exhausted through the exhaust tubulation, is filled with an arc generating and sustaining atmosphere including mercury through the exhaust tubulation, and is sealed at the exhaust tubulation to hermetically seal the inner lamp assembly tubing. The inner lamp assembly is then mounted within a jacket formed from a glass transparent to a given range of radiation. The jacket itself also has an exhaust tubulation. The jacket is then exhausted through the jacket exhaust tubulation, is filled with an arc generating and sustaining atmosphere including mercury through the jacket exhaust tubulation, and is then sealed via the jacket exhaust tubulation to hermetically seal the jacket. Lastly, focused and coherent radiation is directed through the jacket upon either the inner lamp assembly tubing or the inner lamp assembly exhaust tubulation to cause an opening therein to permit fluid communication between the inner lamp assembly and jacket.

BRIEF DESCRIPTION OF THE DRAWINGS

FIG. 4 is another view similar to FIGS. 2 and 3, but illustrating the alternate method step of piercing a hole in the inner lamp assembly tubing rather than the exhaust tubulation.

BEST MODE FOR CARRYING OUT THE INVENTION

For a better understanding of the present invention together with other and further objects, advantages and capability thereof, reference is made to the following disclosure and appended claims in conjunction with the above-described drawings.

There is described herein an improved method of jacketing a fluorescent lamp. The concepts of the invention, although having wide application, are now described as being in particular applicable to compact fluorescent lamps. The present invention is thus applicable to most commonly manufactured tubular lamps such as, by way of example, Philips SL, PL and OSRAM Dulux D lamps. In the particular embodiment described herein and discussed in the table set forth herein, there is described a novel jacketing method for a 13 watt Sylvania Twin Tube compact fluorescent lamp.

In accordance with the invention, rather than mounting the inner lamp assembly unfilled per the prior art, the inner lamp assembly is exhausted, filled and sealed thus forming a light emitting capsule, and is then subsequently mounted in the jacket. After constructing the capsule, it is placed in the outer jacket; the latter is exhausted and back filled with the same pressure and type buffer gas as contained in the capsule and subsequently a laser of the like is used to pierce an exhaust tubulation of the capsule allowing communication of the gases in the outer jacket with those in the light emitting tubes. This procedure permits a much faster exhaust sequence for the light emitting portion of the lamp and outer jacket.

Figure 1:
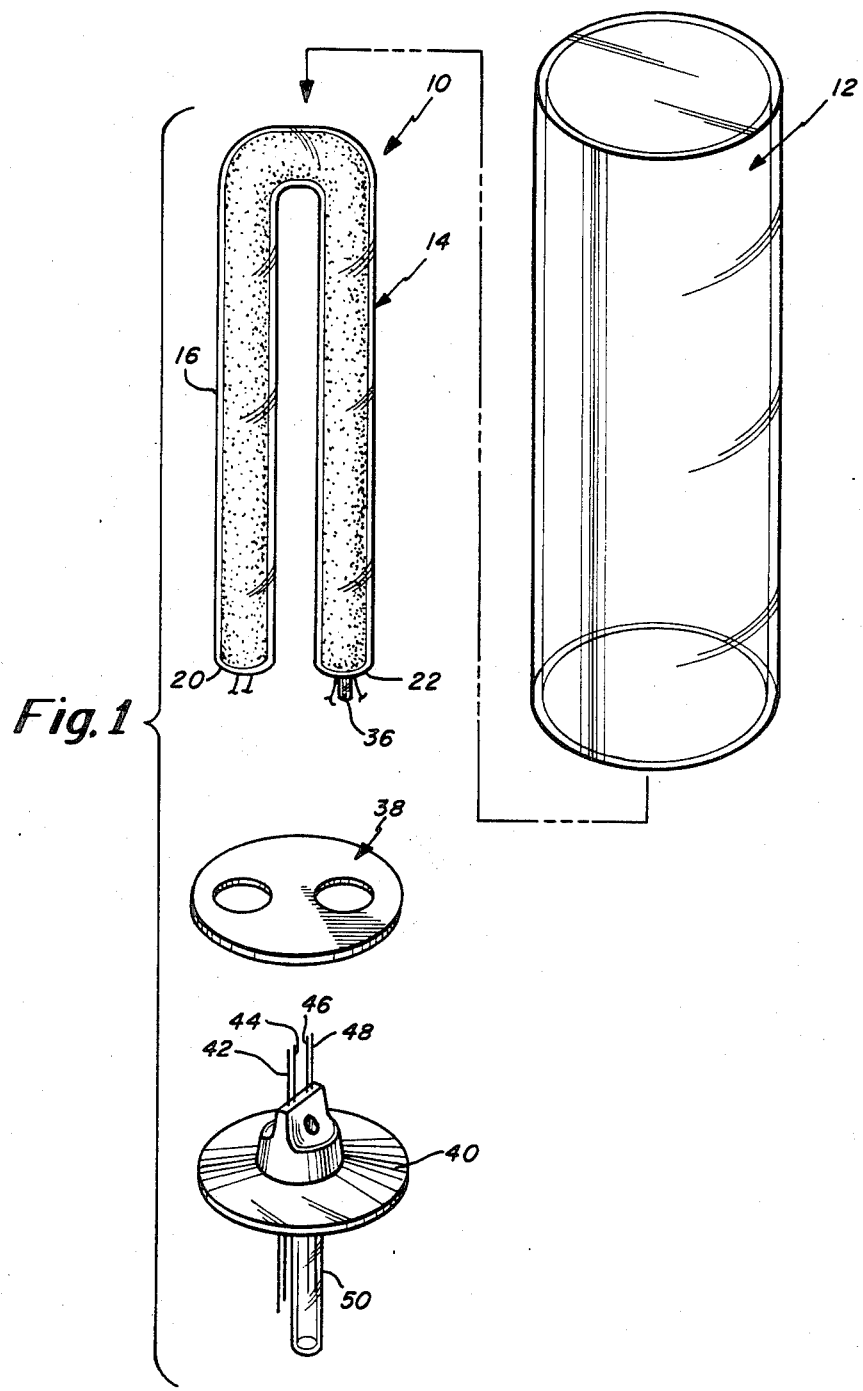
FIG. 1 is an exploded, perspective view of a fluorescent lamp with which the invention may be employed.

Referring now to the drawings with greater particularity, there is shown in FIG. 1 a compact fluorescent lamp 10 having an outer, light transmissive glass envelope 12 which is transparent to a given range of an electromagnetic radiation and which has mounted therein an inner lamp assembly 14. The inner lamp assembly 14 includes at least one phosphor coated tube. In the particular embodiment described herein, there is a single U-shaped tube 16 employed. The U-shaped tube 16 is sealed at the ends 20 and 22. These ends may be closed by sealing flares such as described in U.S. Pat. No. 4,560,357. In this connection, in FIGS. 2 and 3 note the sealing flares 24 and 26.

The sealing flares 24 and 26 have sealed therein lead-in wires 30, 32 and 31, 33, respectively. An electrode 34, 35 is affixed between lead-in wires 30, 32 and 31, 33, respectively. The drawings also illustrate the inner exhaust tubulation 36 which is shown sealed to the flare 26 projecting downwardly therefrom.

The sealing flares may be constructed of a soda-lime glass such as Corning Glass Works type 0081. The U-shaped tube 16 as well as the envelope 12 may preferably also be of the same material. Type 0081 glass has a softening point ($10^{7.6}$ poises) of 696° C. and a thermal expansion coefficient (0°–300° C.) of $93.5 \times 10^{-7/°}$C.

FIG. 1 also illustrates the mounting plate 38 that is adapted to mount the phosphor coated U-shaped tube 16. Also illustrated in FIG. 1 is the sealing flare 40 which has sealed therein lead-in wires 42, 44, 46 and 48 for respective connection to the lead-in wires 31, 33, 30, 32 associated with the tube 16. The sealing flare 40 also carries an exhaust tubulation 50.

Figure 2:
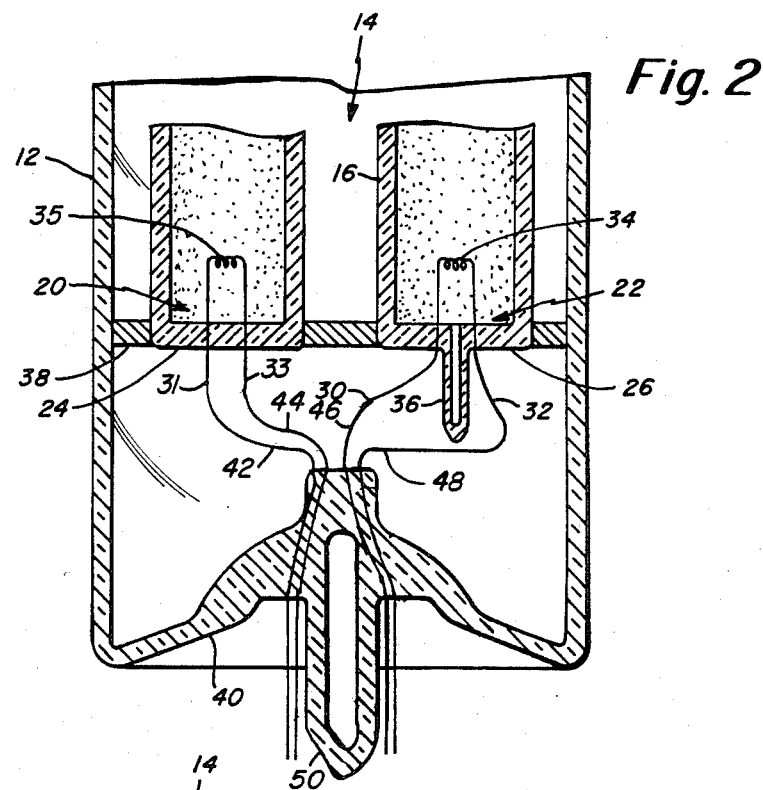
FIG. 2 is a partial, elevational, sectional view of the lamp of FIG. 1 at a partial construction step with the inner lamp assembly still sealed.

FIG. 2 illustrates an intermediate step in the method of the present invention. As a very initial step, the inner lamp assembly comprising the U-shaped tube 16 is exhausted through the tubulation 36. The inner lamp assembly tubing is then filled with an arc generating and sustaining atmosphere, e.g., about 20 mg of mercury and argon at a pressure of 3 torr. The filling occurs through the exhaust tubulation 36. The exhaust tubulation 36 is then sealed to hermetically seal the inner lamp assembly tubing, thus forming the aforementioned light emitting capsule.

Next, the inner lamp assembly is mounted employing the support plate 38 into the jacket 12. The sealing flare 40 is sealed thereto by conventional means. The lead wires are appropriately connected together such as is illustrated in FIGS. 2 and 3.

After the inner lamp assembly has been sufficiently mounted and the sealing flare 40 secured, the jacket 12 alone is exhausted through the jacket exhaust tubulation 50. The jacket 12 is then filled with an arc generating and sustaining atmosphere including mercury through the jacket exhaust tubulation 50. This filling is with the same pressure and type buffer gas as contained in the capsule. Next, the jacket exhaust tubulation 50 is sealed to hermetically seal the jacket.

It is noted that in the step illustrated in FIG. 2, both the inner lamp assembly and the jacket are back-filled. However, there is no gas communication therebetween. Note in FIG. 2 the exhaust tubulation 36 is closed.

Figure 3:
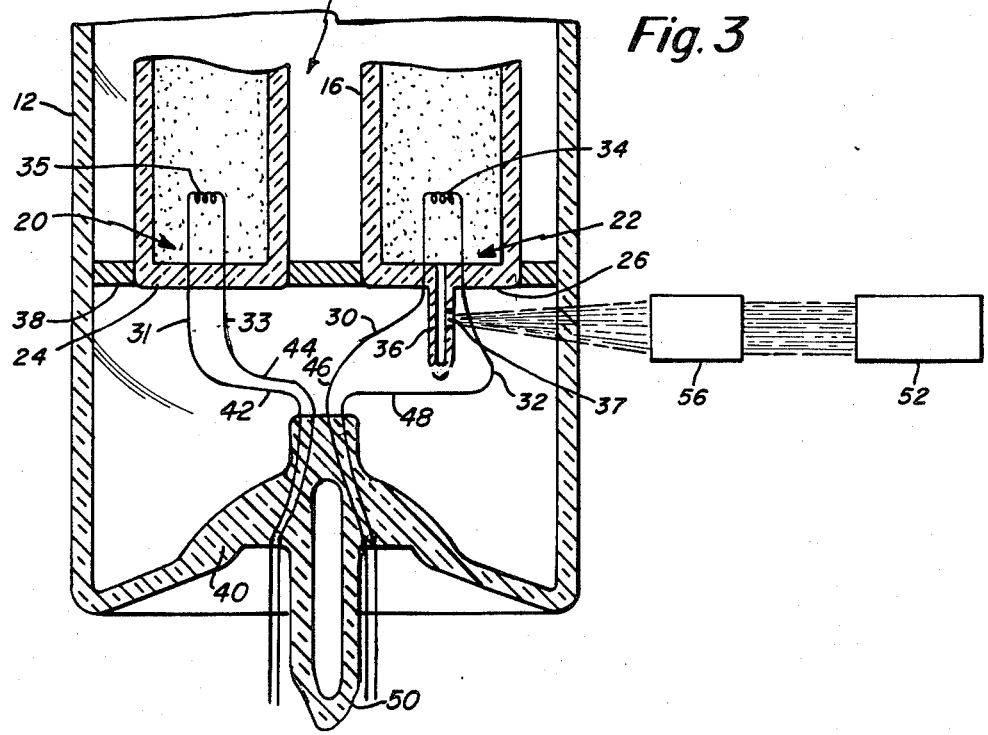
FIG. 3 is a similar view to FIG. 2 showing a subsequent step in the method of the present invention employing radiation directing means for opening the inner lamp assembly exhaust tubulation.

Reference is now made to FIG. 3 for an illustration of the next step in the method. This is the step of directing focused, coherent radiation through the jacket and directed at the exhaust tubulation 36. In this regard, refer in FIG. 3 to the laser source 52 and the focusing means 56. The laser source 52 may comprise one or more ruby lasers. The focusing means 56 may be in the form of an optical system employing, for example, an expanding lens and a focusing lens coupled in an optical serial path. It is noted that the output of the focusing means is directed at the exhaust tubulation. The radiation energy passes through the jacket 12 without any effect thereon and is focused at the exhaust tubulation 36 causing a hole as indicated at 37 in FIG. 3.

In accordance with one embodiment of the invention, the pulsed, focused radiation from a laser (YAG) is used to pierce the hole in the exhaust tubulation that extends, as noted in FIG. 3, from the 13 watt twin tube. A single pulse from the laser beam is sufficient to obtain a 1/16 inch hole in the exhaust tubulation wall. This is the hole 37 illustrated in FIG. 3.

While a laser is employed in the preferred embodiment to puncture the exhaust tubulation of the light capsule, it should be understood that alternatively one may use focused radiation from an incandescent lamp to accomplish the same results. Similarly, a hot wire, whether heated by electromagnetic radiation or lamp current may also be used to fracture the exhaust tubulation. Furthermore, in an alternate method in accordance with the invention, a hole may be pierced in an area other than at the exhaust tubulation. In this regard, refer to the diagram of FIG. 4. In connection with FIGS. 2–4 it is noted that like reference characters have been used to identify like parts. Thus, in FIG. 4 there is shown the laser source 52 and the focusing means 56. The rays therefrom, rather than being directed at the exhaust tubulation 36 instead are directed at the tube 16 to provide a hole at 39 as illustrated in FIG. 4.

As indicated previously, the lamp jacket may be of type 0081 glass. This jacket may be a T-12 diameter tubular domed tube sealed with a flat pressed header.

The exhausting of the jacket may be performed at a temperature on the order of 300° C.

After the exhaust tubulation 36 or the tube 16 itself is pierced, this permits the gas in the outer jacket to communicate via the pierced hole with the gas in the capsule.

Now, it is to be noted that because the capsule is prefilled and sealed, the exhausting procedure relative to the jacket can now be performed quite rapidly. Furthermore, the gas communication within the lamp also can take place quite rapidly. The pierced communication hole such as the hole 37 in FIG. 3 can be opened in a matter of seconds or less. As indicated previously, this hole can be provided with a single pulse of the laser.

One of the significant characteristics of the jacketed lamp of the present invention is the improved stabilized light output. It has been found that this light output is greater than that with the inner lamp assembly used alone. The jacketed lamp can maintain a lower mercury pressure. With the use of the jacket, there are cooler regions in the lamp about the outer extents thereof which provide the lower mercury vapor pressure. This occurs by virtue of the mercury condensing at the outer portions of the jacket. In this regard, refer to the table below:

|  | 285 mA | | 350 mA | |
| --- | --- | --- | --- | --- |
|  | Peak | Stab. | Peak | Stab. |
| CAPSULE IN AIR | | | | |
| Lumens | 927+/−23 | 765+/−17 | 1082+/−9 | 811+/−14 |
| Voltage | 59.8+/−2 | 51.6+/−8 | 57.2+/−1.4 | 47.1+/−.7 |
| Watts | 14.1+/−.3 | 12.3+/−.2 | 16.2+/−.3 | 13.7+/−.3 |
| Current | 279+/−3 | 287+/−2 | 349+/−3 | 349+/−7 |
| LPW | 65.7+/−1.7 | 62.2+/−.9 | 66.7+/−1.4 | 59.3+/−2 |
| CAPSULE IN JACKET | | | | |
| Lumens | 900+/−18 | 913+/−9 | 1015+/−8 | 2030+/−10 |
| Voltage | 59.2+/−2 | 61.1+/−.8 | 59.0+/−1 | 57.9+/−.4 |
| Watts | 13.9+/−.3 | 14.1+/−.1 | 16.6+/−.2 | 15.4+/−.2 |
| Current | 286+/−2 | 284+/−2 | 350+/−1 | 353+/−1 |
| LPW | 64.8+/−.9 | 64.6+/−.8 | 62.1+/−2 | 62.3+/−.9 |

In the above table is noted that with regard to the stabilized output values there is an increase in lumens with the jacketed lamp. There is also a slight increase in lumens per watt (LPW) with the jacketed lamp. By way of example for operation at 350 milliamps, the capsule in air has a light output of 811 lumens while the capsule in the jacket has a light output of 1,020 lumens. Also note at the same current level an increase in stabilized efficiency from 59.3 lumens per watt to 62.3 lumens per watt.

While there has been shown what are at the present considered to be the preferred embodiments of the invention, it will be apparent to those skilled in the art that various changes and modifications can be made herein without departing from the scope of the invention as defined by the appended claims.

We claim:

1. In a method of making a fluorescent lamp the steps comprising: forming an inner lamp assembly including at least one section of phosphor coated tubing, said tubing having end closing means mounting electrodes within said tubing, said inner lamp assembly having an exhaust tubulation projecting therefrom; exhausting said inner lamp assembly tubing through said exhaust tubulation; filling said inner lamp assembly tubing with an arc generating and sustaining atmosphere including mercury through said exhaust tubulation; sealing said exhaust tubulation to hermetically seal said inner lamp assembly tubing; mounting said inner lamp assembly within a jacket formed from glass transparent to a given range of radiation, said jacket also having an exhaust tubulation; exhausting said jacket through the jacket exhaust tubulation; filling said jacket with an arc generating and sustaining atmosphere including mercury through the jacket exhaust tubulation; sealing said jacket exhaust tubulation to hermetically seal said jacket; and directing focused, coherent radiation through said jacket upon said inner lamp assembly tubing or exhaust tubulation to cause an opening therein, whereby fluid communication is enabled between the inner lamp assembly tubing and jacket.

2. The method of claim 1 wherein the step of directing focused, coherent radiation includes providing a laser source.

3. The method of claim 1 wherein the step of directing focused, coherent radiation includes providing a laser source, providing a focusing means, and coupling the light output from said laser source, via said focusing means onto said inner lamp assembly tubing or exhaust tubulation.

4. The method of claim 1 wherein the radiation is directed at the inner lamp assembly exhaust tubulation only.

5. The method of claim 1 wherein the radiation is directed at the inner lamp assembly tubing only.

6. In a method of making a fluorescent lamp the steps comprising: providing an inner lamp assembly including at least one section of phosphor coated tubing having electrodes mounted therein, said inner lamp assembly being prefilled and sealed with an arc generating and sustaining atmosphere including mercury; mounting said inner lamp assembly within a jacket formed from glass transparent to a given range of radiation, sdid jacket having an exhaust tubulation; exhausting said jacket through the jacket exhaust tubulation; filling said jacket with an arc generating and sustaining atmosphere including mercury through the jacket exhaust tubulation; sealing said jacket exhaust tubulation to hermetically seal said jacket; and directing focused, coherent radiation through said jacket upon said inner lamp assembly tubing or exhaust tubulation to cause an opening therein, whereby fluid communication is enabled between the inner lamp assembly tubing and jacket.

7. A method of claim 6 wherein the step of directing focused, coherent radiation includes providing a laser source.

8. The method of claim 6 wherein the step of directing focused, coherent radiation includes providing a laser source, providing a focusing means, and coupling the light output from said laser source, via said focusing means onto said inner lamp assembly tubing or exhaust tubulation.

9. A method of claim 6 wherein the radiation is directed at the inner lamp assembly exhaust tubulation only.

10. The method of claim 6 wherein the radiation is directed at the inner lamp assembly tubing only.

* * * * *